June 27, 1967  F. M. BRINKMEYER ET AL  3,327,413
MATERIAL GRADING IMPLEMENT

Filed June 22, 1964  6 Sheets-Sheet 1

INVENTORS
F. M. BRINKMEYER
P. E. HANSER & J. H. CREIGHTON
BY William A. Murray

ATTORNEY

INVENTORS
F. M. BRINKMEYER
P. E. HANSER & J. H. CREIGHTON
BY William A. Murray
ATTORNEY INVENTORS
F. M. BRINKMEYER
P. E. HANSER & J. H. CREIGHTON
BY
William A. Murray

ATTORNEY

June 27, 1967   F. M. BRINKMEYER ET AL   3,327,413
MATERIAL GRADING IMPLEMENT

Filed June 22, 1964   6 Sheets-Sheet 6

INVENTORS
F. M. BRINKMEYER
P. E. HANSER & J. H. CREIGHTON
BY William A. Murray
ATTORNEY United States Patent Office 3,327,413
Patented June 27, 1967

3,327,413
MATERIAL GRADING IMPLEMENT
Francis M. Brinkmeyer and Paul E. Hanser, Rock Island, Ill., and John H. Creighton, Bettendorf, Iowa, assignors to Deere & Company, Moline, Ill., a corporation of Delaware
Filed June 22, 1964, Ser. No. 376,870
10 Claims. (Cl. 37—145)

This invention relates to an earth handling type implement and more particularly to the type of implement generally referred to in the trade as a road grader.

It is conventional in many road graders to provide a rear traction vehicle that pushes or drives a forward implement carrying vehicle. The implement carrying vehicle is connected to the rear traction vehicle to move laterally about a vertical pivotal connection and is composed of a pair of front steerable wheels and a longitudinal beam extending from the steerable wheels rearwardly to the pivotal connection. The beam suspends from an overhead position the various implements and grading devices that normally are used on a road grader. These devices are normally supported on a particular type subframe that may be moved so that a blade mounted on the frame may be disposed horizontally, inclined, or vertically depending upon the desired end result in the grading operation. A rather complicated system of hydraulic cylinders and linkage interconnections between the beam structure and the subframe is provided to position the grader blade.

With the above in mind, it is a primary object of the present invention to provide with this type of grader a hydraulic control system featuring the basic control levers or elements to be supported on the traction device and the valve systems for the various hydraulic power units to be positioned on the implement supporting vehicle. The connections between the control elements and the control valves feature linkages that are interconnected to move about a pivot substantially on the vertical axis defined by the interconnection between the two vehicles. A novel and unique linkage arrangement is therefore provided to interconnect the control elements and hydraulic valves so as not to be in any manner affected by the normal lateral swinging of the beam structure about its vertical pivotal interconnection.

It is a further main object of the present invention to provide with the implement supporting vehicle a forwardly positioned implement supporting structure pivotally connected for vertical movement to the beam structure rearwardly of the front steerable wheels and having implement supporting elements on opposite sides of the beam structures extending over the axle structure of the steerable wheels in arch-like manner to a forward end forwardly of the steerable wheels, and having provision at their forward ends for carrying an implement of the ground moving or engaging type. By providing the auxiliary type of implement support, the area between the front steerable wheels and the rear traction wheels may be completely utilized for moving the basic road grader blade. Consequently the blade itself may be constructed of substantially wider dimension, or the distance between the steerable and traction wheels may be reduced substantially.

Other objects and advantages of the present invention will become apparent to those skilled in the art as the nature of the invention is better understood from the following description and as shown in the accompanying drawings.

Figures 1, 2:
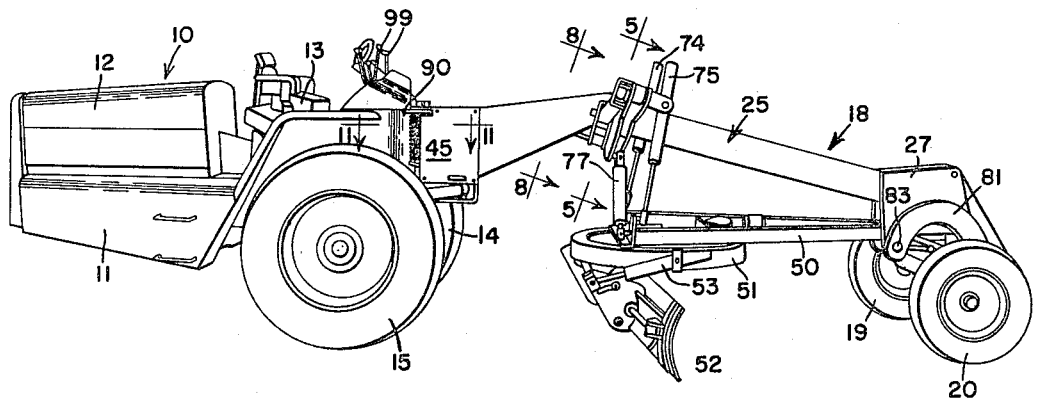
FIG. 1 is a side perspective view taken from the right side of the implement.
FIG. 2 is a rear side perspective view taken from the left side of the implement.
Figure 3:
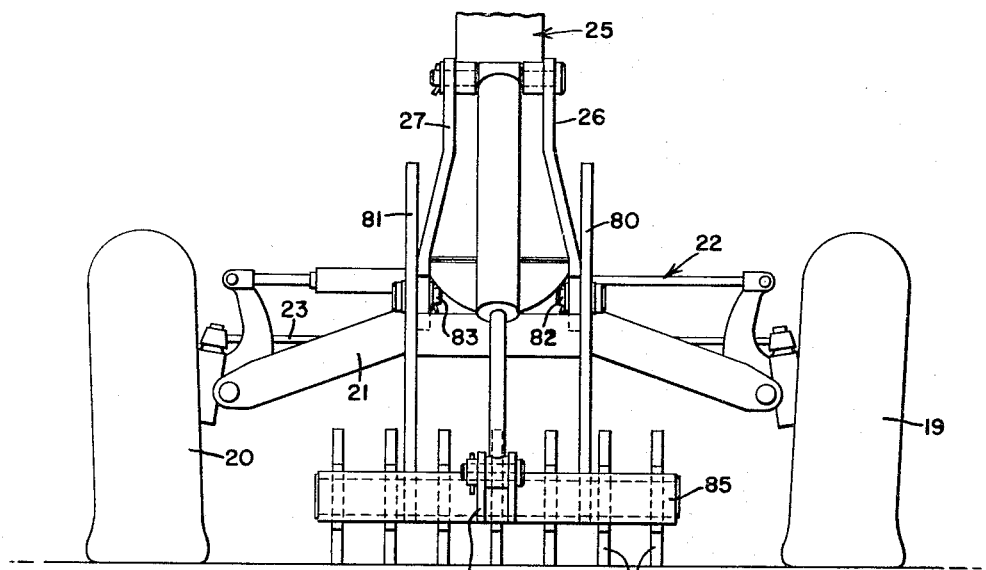
FIG. 3 is a front view of the implement.
Figure 4:
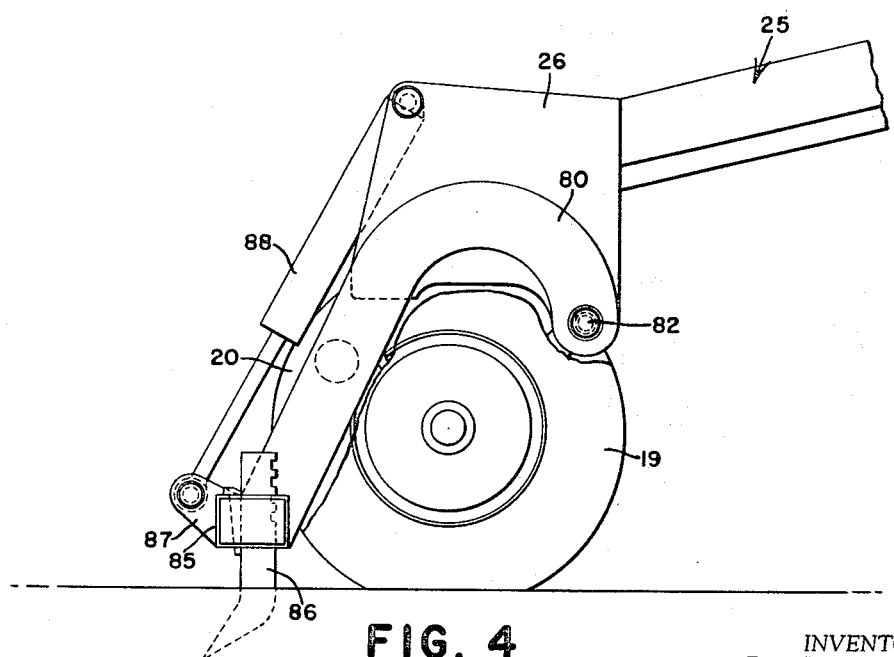
FIG. 4 is a left side view of the forward end of the carrier portion of the implement and showing portions broken away for purposes of clarity.
Figure 5:
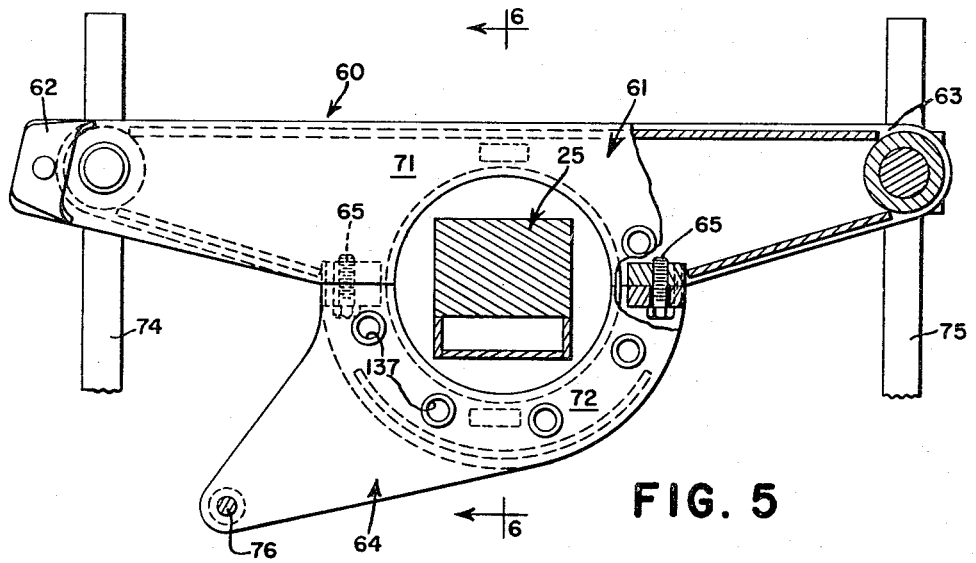
FIG. 5 is a sectional view taken substantially along the line 5—5 of FIG. 1.
Figure 6:
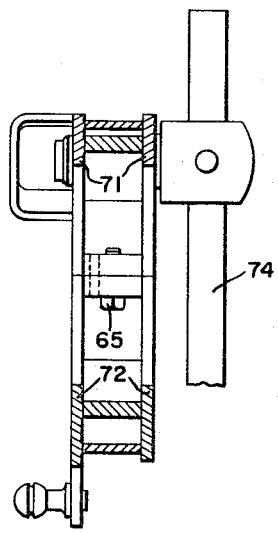
FIG. 6 is a sectional view of the saddle as taken substantially along the line 6—6 of FIG. 5.
Figure 7:
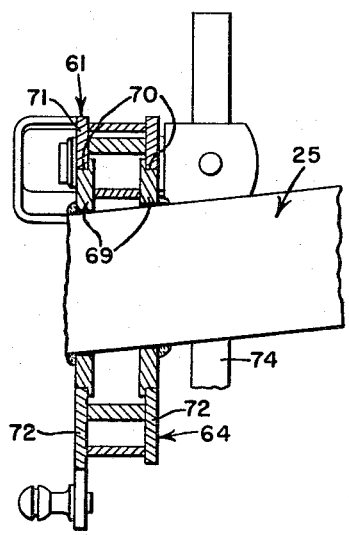
FIG. 7 is a view somewhat similar to FIG. 6 but showing a portion of the longitudinally extending beam structure connected thereto.
Figure 8:
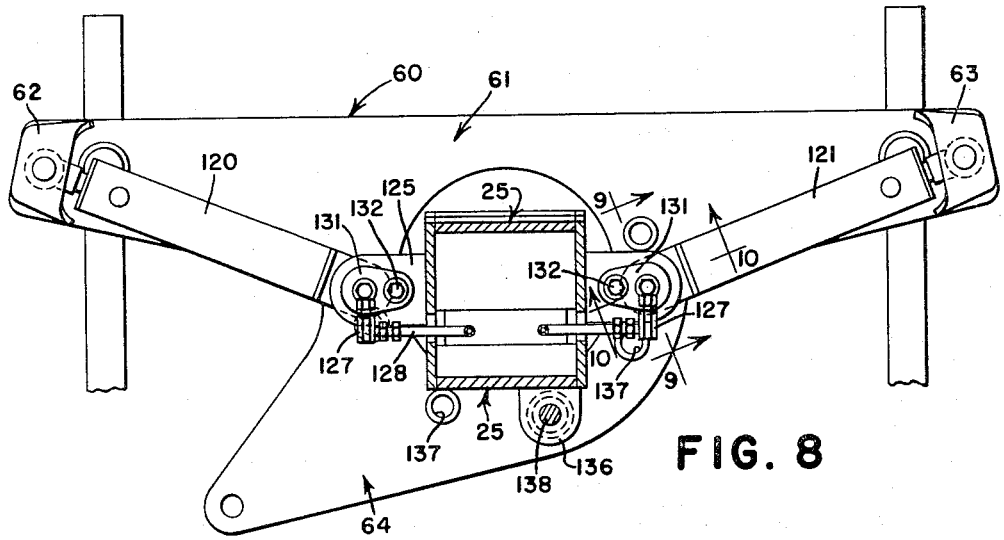
FIG. 8 is a view similar to FIG. 5 but taken further rearwardly and along the line 8—8 of FIG. 1.
Figure 9:
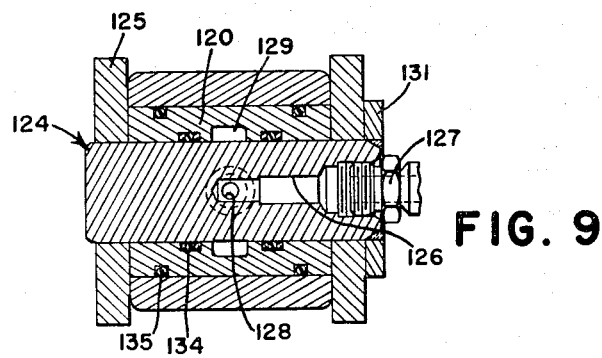
FIG. 9 is a sectional view taken substantially along the line 9—9 of FIG. 8.
Figure 10:
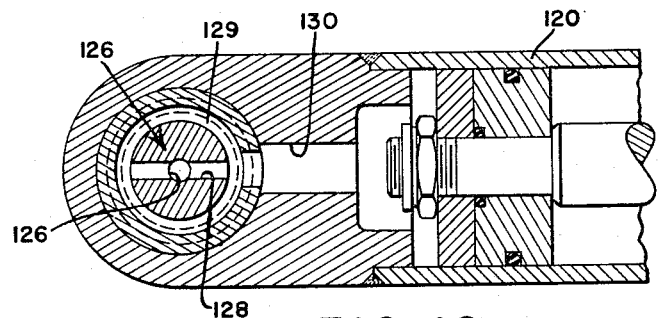
FIG. 10 is a sectional view taken substantially along the lines 10—10 of FIG. 8.
Figure 11:
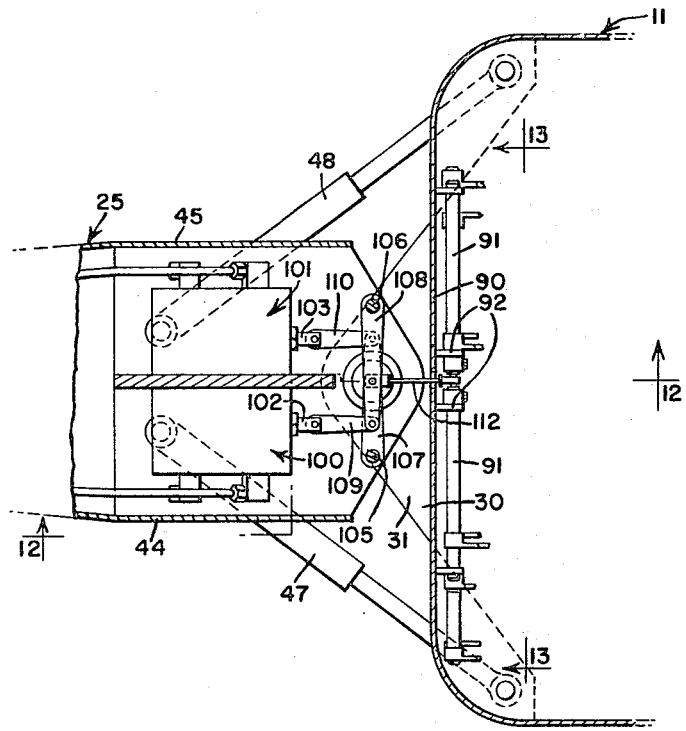
FIG. 11 is a sectional view taken substantially along the line 11—11 of FIG. 1.
Figure 12:
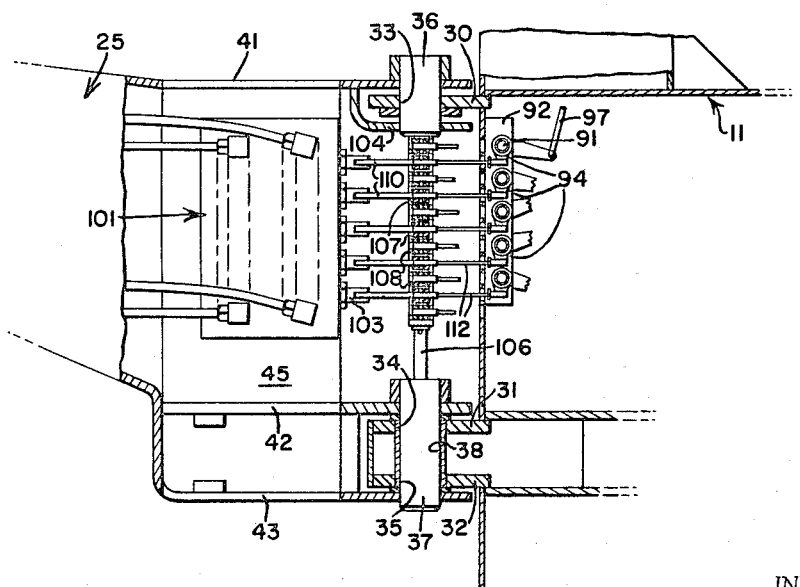
FIG. 12 is a sectional view taken substantially along the line 12—12 of FIG. 11.
Figure 13:
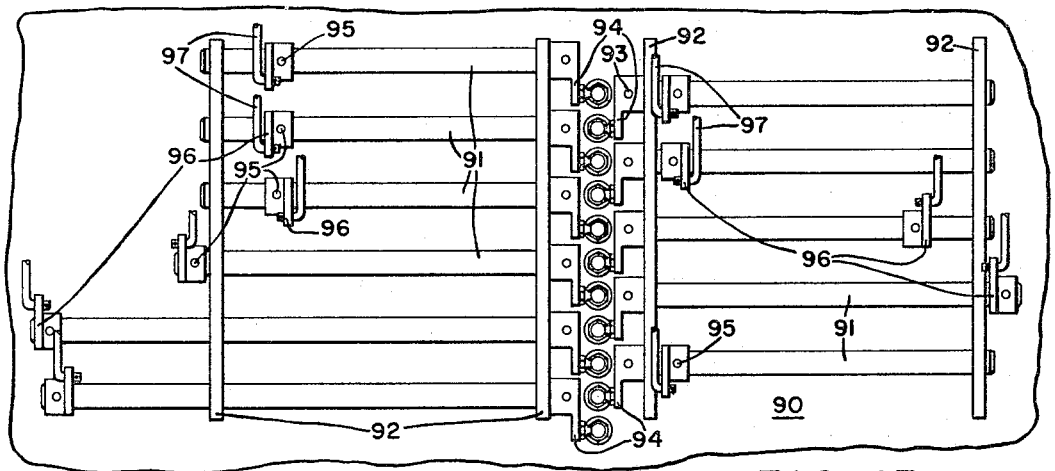
FIG. 13 is a sectional view taken substantially along the line 13—13 of FIG. 11.
Figure 14:
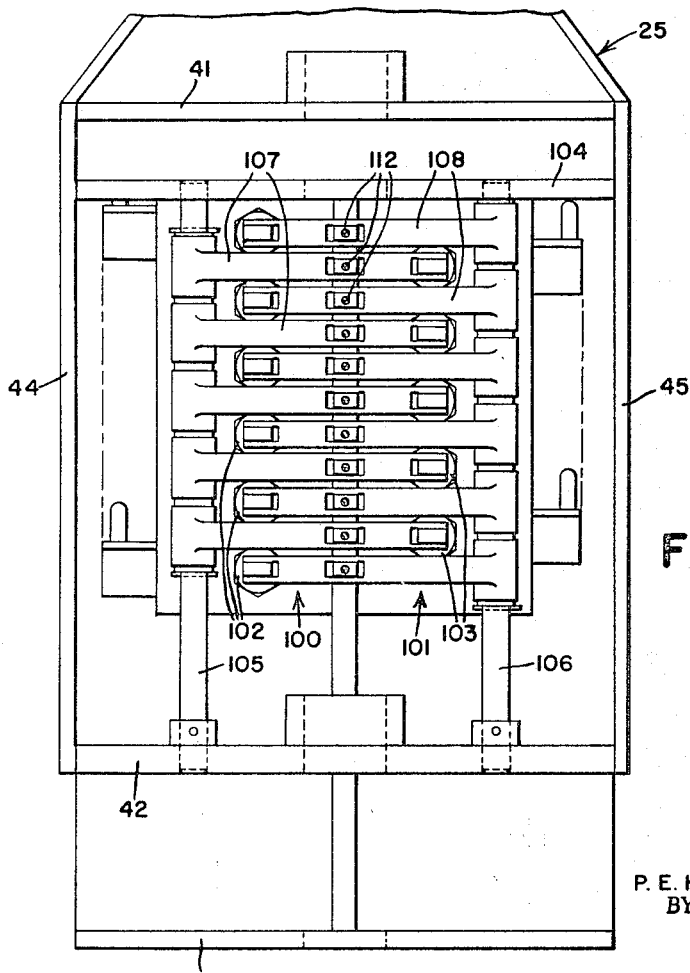
FIG. 14 is a rear view looking forwardly, of the valve structure and linkage of the implement carrying vehicle.

The road grader is composed in part of a main traction vehicle 10 having a main frame 11 supporting at the rear end thereof, a tractor engine, indicated in its location by the engine hood 12, and an operator's station, as indicated by the operator seat 13. The traction vehicle is carried on a pair of traction wheels 14, 15 driven by the engine of the vehicle 10.

The grader further includes an implement carrying vehicle 18 having a pair of forward steerable wheels 19, 20 carried on opposite ends of a transverse axle structure 21 and controlled both for leaning and for steering by mechanisms 22, 23 respectively. The transverse axle structure is carried on the underside of a longitudinally extending or fore-and-aft main beam structure 25, generally of box construction and having welded at its forward end a pair of vertically disposed plates 26, 27. The main frame 11 of the traction vehicle 10 is provided with a series of three vertically spaced plates 30, 31, 32 projecting forwardly from the frame 11 and have vertically aligned pin receiving openings 33, 34, 35 respectively for receiving upper and lower vertically aligned pivot pins 36, 37, a journal member 38 being provided in the lower openings 34, 35 for receiving the pin 37. The rear end of the beam structure 25 is provided with an upper horizontally disposed plate 41, and a pair of lower horizontally disposed plates 42, 43 having pin openings receiving the upper and lower pins 36, 37 and pivotally interconnecting the beam 25 to the frame 11 in a manner providing for lateral movement between the forward steering vehicle 18 and the rear traction vehicle 10. Consequently the pins 36, 37 provide a vertical pivotal axis about which the two vehicles may have relative lateral movement.

A pair of upright side plates 44, 45 is provided on the respective left- and right-hand sides and interconnect the edges of the plates 41, 42, 43 to provide a compartment type area within the rear end of the beam structures 25. A pair of hydraulic cylinders 47, 48 is connected between and is provided to adjust the angular disposition of the traction and implement carrying vehicles.

As is conventional, the overhead beam 25 carries a triangular shaped subframe 50 having its apex portion extended to the forward end of the vehicle 18 and articularly connected thereto so that the entire subframe may move both vertically, horizontally, and also angularly about a fore-and-aft horizontal axis. Such structure is conventional and it is believed no detail of the exact mounting means is necessary. The rear portion of the subframe 50 carries a gear circle 51 that in turn carries a grader blade structure 52 in a manner capable of angling the blade 52 relative to the subframe 50. The blade structure 52 includes a blade tilting mechanism controlled by a cylinder 53 extending from the circle 51 to the blade structure 52. The circle 51 and subframe 50 are supported on a saddle structure 60 that rotates about the longitudinally extending beam 25. The saddle 60 is composed of an upper beam 61 above the structure 25 with outwardly spaced ends 62, 63, and a lower portion 64 bolted at 65 to the upper portion 61 and disposed beneath the beam structure 25. At the point of connection to the saddle 60, the beam structure 25 is provided with a pair of transverse vertically disposed guide plates 69 having outer annular shoulders 70 serving as guide means for the saddle 60. The upper beam portion 61 has fore-and-aft spaced apart and vertically disposed plates 71 having semicircular openings engaging the shoulders 70. The lower portion 64 of the saddle has fore-and-aft extending and vertically disposed plates 72 with semicircular openings also engaging the shoulders 70. When bolted together the semicircular openings of the two-parts 61, 64 form a complete circle engaging the angular shoulders 70 and forming therewith a pivotal connection.

Extending between the outer ends 62, 63 of the upper saddle portion 61 and the circle 51 is a pair of vertically disposed hydraulic cylinders 74, 75 that operates to raise and lower the circle 51 relative to the saddle 60. The lower portion 64 of the saddle 60 is provided with an outwardly projecting portion carrying a pin 76 pivotally receiving the cylinder end of the hydraulic unit 77 that has its rod end connected to the circle 51. As is conventional, the cylinders 74, 75 are articulately connected to the ends 62, 63 of the saddle and consequently the hydraulic cylinder 77 may be utilized to shift the entire circle 51 transversely in respect to the beam structure 25. The cylinders 74 and 75 as well as the cylinder 77 are utilized in both shifting as well as angling the entire blade structure 52 in respect to the beam structure 25. It should also be noted the blade structure 52 may be moved a full 360° without the ends of the blade contacting the wheels 19, 20 or wheels 14, 15 and there is nothing within the expanse between the wheels 14, 15 and 19, 20 capable of causing interference with the blade structure 52.

A pair of implement supporting members or arms 80, 81 is pivotally mounted for vertical movement on the respective side plates 26, 27 by transverse horizontal pivot pins 82, 83. The arms 80, 81 extend forwardly from the pivot pin 82, 83 in archlike fashion over the transverse axle structure 21, to lower forward ends interconnected by a transverse beam 85 carrying scarifier teeth 86. The beam is provided with a forwardly extending lug structure 87 receiving the rod end of a hydraulic cylinder 88, the latter having its upper cylindrical end pivotally connected to the forward upper corner of the plates 26, 27. The hydraulic cylinder 88 raises and lowers the entire implement support members 80, 81. Also, since the pins 82, 83 are rearward of the wheels, the actual force or load created by the scarifier teeth in the ground is resisted at a point rearward of the steering wheels 19, 20. Again, referring to the free expanse between the steering wheels 19, 20 and the traction wheels 14, 15 it should be recognized that by providing the scarifier forward of the front steering wheels, the same effect may be received as moving the scarifier between the front and rear wheels, but in the present instance it does not have the effect of creating interference between the scarifier and free movement of the blade structure 52 throughout 360° of rotation.

The main frame 11 is provided with an upright U-shaped plate 90 facing forwardly or toward the implement carrying vehicle 18. The interface of the transverse bight portion of the plate 90 carries rearwardly extending brackets 92 supporting a series of vertically spaced horizontal rods 91. The rods 91 form a part of the control mechanism for the entire power system on the implements, and consequently the rods are generally equal in quantity to the number of hydraulic cylinders used to position various of the units and parts on the implement 18. Each horizontal rod 91 has an inner end closely adjacent to the fore-and-aft centerline of the traction vehicle and has pinned thereto at 93 a small rockarm 94 actuated by rotation or rocking of the respective rod 91. Also, each rod 91 carries thereon by means of pins 95 a rearwardly projecting control arm 96. The rear ends of the arms 96 are connected to lower ends of vertically disposed connecting rods 97. The upper ends of the rods 97 are connected to and are controlled by control levers or elements 99. The exact connection between the rods 97, and elements 99 is not important for purposes of the present invention although it should be recognized that each control lever 99 does in fact control one shaft 91.

Left- and right-hand valve stacks 100, 101 are provided respectively on opposite sides of the fore-and-aft centerline of the beam structure 25. The stacks 100, 101 have vertically spaced control elements or valves 102, 103, respectively offset from the aforesaid centerline. A plate 104 is spaced below the overhead plate 41 and is positioned to receive and support between it and the lower plate 42 a pair of upright rods 105, 106 positioned on opposite sides and equally spaced from the fore-and-aft centerline of the beam structure 25. A plurality of horizontal arms 107, 108 are vertically spaced on the respective rods 105, 106 and extend transversely across the centerline to remote ends adjacent the respective control elements or valves 103, 102. The arms 108 are connected to the valves 102 by links 109 and the arms 107 are connected to the valves 103 by links 110. The respective arms 107, 108 are on the same horizontal level as their respective valves 103, 102 and cross the centerline of both the traction vehicle 10 and the implement vehicle 18 substantially on the vertical pivot as denoted by the pivot pins 36, 37. The arms 94, forming a part of the control mechanism, are connected to the respective levers 107, 108 by short horizontal connecting rods 112 extending between the lower ends of the respective arms 94 to the respective levers 107, 108 and are articulately connected to the latter at points substantially on the axis of the pivotal connection between the traction vehicle 10 and implement supporting vehicle 18.

By the interconnection between the basic control members or levers 99 adjacent the operator's station or seat 13 and the control valves 102, 103 being provided in such a manner that a direct connection occurs on the axis of the pivotal connection between the beam structure 25 and main frame 11, the hydraulic cylinders 47, 48 may be regulated to adjust the angular disposition between the structure 25 and frame 11 without in any manner affecting the adjustment of the other cylinders on the implement. This is considered to be a relatively important feature since it permits the space within the beam structure 25 to be utilized to support the entire valve system for the hydraulic power units of the implements while retaining the control on the traction implement of the grader.

In turning the saddle 60 about the swivel guides on the beam 25, a pair of single acting hydraulic cylinders 120, 121 are utilized and extend between opposite ends 62, 63 of the saddle to a point eccentric to the axis of rotation of the saddle 60. As is clearly evident, the purpose of, or desire of relocating the angularly position of the saddle 60 is to permit a blade structure 52 to be angled as high as 90° relative to the ground. It is proposed to provide in the pivotal connection between the cylinders 120, 121 and beam structure 25 comprising pivot pins 124 extending through a pair of lugs 125 projecting from each side of the beam structure 25. Each pin 124 is provided with an axial orifice 126 having a suitable threaded or tapped outer end for receiving a hose fitting 127 and a radially extending opening 128 feeding into an annular fluid groove 129, the latter being in communication with a passage 130 leading to the internal portions of the respective cylinders 120, 121. An ear or bracket 131 is fixed to the end of the pin 124 and may be bolted at 132 to the respective bracket 125 for purpose of preventing rotation of the pin 124. Packing, such as at 134, 135, is provided to seal the pin 124 against fluid leakage.

As is clearly apparent, regardless of the various positions the cylinders 120, 121 may take relative to the ears 125, fluid will always flow uninterruptingly into the ends of the cylinders 120, 121. Also, since the pins 124 are fixed against angular movement, the hoses 128 leading from the respective fittings 127 may be uniformly positioned and held in the position without in any manner being affected by the movement of the cylinders 120, 121. The beam 25 is further provided with a depending bracket 136 having a pin opening adapted for registry with angularly spaced openings 137 in the saddle. A pin 138 may be adapted to lock the saddle 60 and beam 25 against relative movement.

While only one form of the invention has been shown, it should be recognized that other forms and variations of the invention will occur to those skilled in the art. Therefore, while the preferred form is shown and described in concise and detailed manner for the purpose of clearly illustrating the principles of the invention it is not the intention to limit or narrow the invention beyond the broad concepts set forth in the appended claims.

What is claimed is:

1. In a material handling implement including a main traction vehicle having a main frame supported on traction wheels and an implement-supporting vehicle forward of the traction vehicle, said implement-supporting vehicle including a front transverse axle structure carrying at opposite ends thereof steerable wheels and an elongated beam structure extending from a forward end spacedly between the steerable wheels to a rear end adjacent the main frame; an upright pivotal connection between the rear end of the beam structure and the main frame permitting lateral movement between the vehicles about the axis of the connection; earth-working implement means suspended from the beam structure between the traction and steerable wheels; a front implement support composed of a pair of arm members pivotally supported for vertical movement on the beam structure rearwardly of the transverse axle structure and extending in arch-like fashion over the axle structure to forward implement-supporting ends; hydraulic power means for effecting adjustment of the earth-working implement means, implement support, and lateral movement of the beam structure about the connection; a plurality of hydraulic valve elements on the beam structure adjacent the connection for operating at least a part of the power means; control elements for the valve elements supported on the main frame adjacent the connection; means operatively interconnecting the control elements and the valve elements and including a plurality of levers supported on the beam structure and articulately connected to the valve elements, and linkage means extending from the control elements and operatively connected to the levers, said linkage means including links pivotally connected to the respective levers about vertical pivots on the aforesaid axis of the connection whereby pivoting of the beam about the connection will not effect substantial adjustment of the valve elements.

2. In a material handling implement including a main traction vehicle having a main frame supported on traction wheels and an implement-supporting vehicle forward of the traction vehicle, said implement-supporting vehicle including front steerable wheels and an elongated beam structure extending from a forward end adjacent the steerable wheels to a rear end adjacent the main frame; an upright pivotal connection between the rear end of the beam structure and the main frame permitting lateral movement between the vehicles about the axis of the connection; earth-working implement means suspended from the beam structure; hydraulic power means for effecting adjustment of the earth-working implement means and lateral movement of the beam structure about the connection; a plurality of hydraulic valve elements on the beam structure adjacent the connection for operating at least a part of the power means; control elements for the valve elements supported on the main frame adjacent the connection; means operatively interconnecting the control elements and the valve elements and including a plurality of levers supported on the beam structure and articulately connected to the valve elements, and linkage means extending from the control elements and operatively connected to the levers and including links pivotally connected to the respective levers about vertical pivots substantially on the aforesaid axis of the connection whereby pivoting of the beam structure about the connection will not effect substantial adjustment of the valve elements.

3. In a material handling implement including a main traction vehicle having a main frame supported on traction wheels and an implement-supporting vehicle forward of the traction vehicle, said implement-supporting vehicle including front steerable wheels and a beam structure extending from a forward end adjacent the steerable wheels to a rear end adjacent the main frame; an upright pivotal connection between the rear end of the beam structure and the main frame permitting lateral movement between the vehicles about the axis of the connection; earth-working implement means supported by the beam structure; hydraulic power means for effecting adjustment of the earth-working implement means and lateral movement of the beam structure about the connection; a plurality of hydraulic valve elements on the beam structure for operating at least a part of the power means; control elements for the valve elements supported on the main frame; means operatively interconnecting the control elements and the valve elements and including a plurality of articulate interconnections for the respective control elements adapted for articulation about points substantially on the aforesaid axis of the connection whereby pivoting of the beam structure about the connection will not effect substantial adjustment of the valve elements.

4. In a material handling implement including a main traction vehicle having a main frame supported on traction wheels and an implement-supporting vehicle forward of the traction vehicle, said implement-supporting vehicle including front steerable wheels and an elongated beam extending from a forward end adjacent the steerable wheels to a rear end adjacent the main frame; an upright pivotal connection between the rear end of the beam and the main frame permitting lateral movement between the vehicles about the axis of the connection; hydraulic power means supported on the beam; a vertical stack of hydraulic valve elements on the beam for operating at least a part of the power means; an operator's station on the main frame; manually operable control elements on the main frame adjacent the station for controlling the valve elements; means operatively interconnecting the control elements and the valve elements and including a plurality of levers supported on the beam and articulately connected to the valve elements, and linkage means extending from the control elements and operatively connected to the levers including links pivotally connected to the respective levers about pivots substantially on the aforesaid axis of the connection whereby pivoting of the beam about the connection will not effect substantial adjustment of the valve elements.

5. The invention defined in claim 4 in which the levers are supported on the beam to pivot about a vertical axis offset from the axis of the connection and extend from their respective pivots to traverse the axis of the connection; and further characterized by the aforesaid links lying substantially on the fore-and-aft centerline of the tractor vehicle.

6. The invention defined in claim 5 further characterized by the linkage means including transverse rock arm means connected to the links for affecting fore-and-aft movement of the links and connected to the manual control elements for rocking thereof in response to adjustment of the control elements.

7. In a material scraper including a rear traction vehicle and an implement-supporting vehicle forward of the traction vehicle, said implement-supporting vehicle including front transverse axle structure carrying steerable wheels at opposite ends and an elongated beam structure extending from a forward end inwardly of and supported on the steerable wheels to a rear end adjacent the traction vehicle; an upright pivotal connection between the rear end of the beam structure and the traction vehicle permitting lateral movement between the vehicles about the axis of the connection; an earth-working blade beneath the beam structure between the traction vehicle and steerable wheels; means on the beam structure for adjusting the blade including a mechanism for swinging the blade laterally about an upright axis; a front implement support pivotally supported for vertical movement on the beam structure adjacent the transverse axle structure and extending forwardly of the axle structure to a forward transverse horizontal beam forwardly of the axle structure; an hydraulic motor extending between the forward end of the beam structure and implement support for raising and lowering the transverse horizontal beam; and transversely spaced scarifier teeth fixed to the horizontal beam and depending therefrom.

8. In a material handling implement including a main traction vehicle having a main frame supported on traction wheels and an implement-supporting vehicle forward of the traction vehicle, said implement-supporting vehicle including front wheels and a structure extending from a forward end adjacent the wheels to a rear end adjacent the main frame; an upright pivotal connection between the rear end of the structure and the main frame permitting lateral movement between the vehicles about the axis of the connection; earth-working implement means supported by the structure; hydraulic power means for effecting adjustment of the earth-working implement means and lateral movement of the structure about the connection; a plurality of hydraulic valve elements on the structure for operating at least a part of the power means; control elements for the valve elements supported on the main frame; means operatively interconnecting the control elements and the valve elements and including a plurality of articulate interconnections for the respective control elements adapted for articulation about points substantially on the aforesaid axis of the connection whereby pivoting of the structure about the connection will not effect substantial adjustment of the valve elements.

9. A material handling implement comprising: a rear traction vehicle having a rear frame and supported on a pair of transversely spaced traction wheels; a front implement-supporting vehicle having a front frame supported on a pair of transversely spaced wheels; an upright pivotal connection between the rear part of the front frame and the front part of the rear frame permitting lateral movement between the vehicles about the axis of the connection; earth-working implement means on the front vehicle; hydraulic power means for effecting adjustment of the earth-working implement means and lateral movement between the vehicles about the connection; a plurality of hydraulic valve elements supported on the front vehicle for operating at least a part of the power means; control elements for the valve elements supported on the rear vehicle; and means operatively interconnecting the control elements and the valve elements including a plurality of articulate interconnections for the respective control elements adapted for articulation substantially on the aforesaid axis of the connection whereby movement of the vehicles about the connection will not effect substantial adjustment of the valve elements.

10. An implement-carrying tractor comprising: a rear vehicle and a front vehicle, each having a pair of transversely spaced wheels, at least one pair of which are traction wheels; an upright pivotal connection between the vehicles permitting lateral movement about the axis of the connection; earth-working implement means on one of the vehicles; hydraulic power means for effecting adjustment of the earth-working implement means and lateral movement between the vehicles about the connection; a plurality of hydraulic valve elements supported on one of the vehicles for operating at least a part of the power means; control elements for the valve elements supported on the other of the vehicles; and means operatively interconnecting the control elements and the valve elements including a plurality of articulate interconnections for the respective control elements adapted for articulation substantially on the aforesaid axis of the connection whereby movement of the vehicles about the connection will not effect substantial adjustment of the valve elements.

References Cited

UNITED STATES PATENTS

| | | | |
|---|---|---|---|
| 2,130,274 | 9/1938 | Harrison et al. | |
| 2,193,367 | 3/1940 | Harrison et al. | |
| 2,300,801 | 11/1942 | Parker. | |
| 2,339,518 | 1/1944 | Reisser | 37—124 |
| 2,374,016 | 4/1945 | Henneuse | 37—156 |
| 2,488,016 | 11/1949 | Lado | 37—145 |
| 2,494,324 | 1/1950 | Wright | 37—156 |
| 2,655,743 | 10/1953 | Ross | 37—156 |
| 3,092,920 | 6/1963 | Benno | 37—117.5 |
| 3,096,696 | 7/1963 | Reisser | 37—156 X |

ABRAHAM G. STONE, *Primary Examiner.*

R. L. HOLLISTER, *Assistant Examiner.*